US 6,753,960 B1

(12) United States Patent
Polynkin et al.

(10) Patent No.: US 6,753,960 B1
(45) Date of Patent: Jun. 22, 2004

(54) OPTICAL SPECTRAL POWER MONITORS EMPLOYING FREQUENCY-DIVISION-MULTIPLEXING DETECTION SCHEMES

(75) Inventors: Pavel G. Polynkin, Fremont, CA (US); Jeffrey P. Wilde, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 0 days.

(21) Appl. No.: 10/006,533

(22) Filed: Dec. 5, 2001

(51) Int. Cl.[7] .................................................. G01J 3/28
(52) U.S. Cl. ......................................................... 356/330
(58) Field of Search ................................. 356/310, 330

(56) References Cited

U.S. PATENT DOCUMENTS

| | | | | | |
|---|---|---|---|---|---|
| 4,193,691 | A | * | 3/1980 | Fjarlie | 356/330 |
| 5,061,049 | A | * | 10/1991 | Hornbeck | 359/224 |
| 5,631,735 | A | | 5/1997 | Nagai | |
| 6,128,078 | A | * | 10/2000 | Fateley | 356/330 |
| 6,239,889 | B1 | | 5/2001 | Harley et al. | |
| 6,263,123 | B1 | * | 7/2001 | Bishop et al. | 385/15 |
| 6,504,943 | B1 | * | 1/2003 | Sweatt et al. | 382/103 |
| 2002/0131687 | A1 | * | 9/2002 | Wilde | 385/24 |

OTHER PUBLICATIONS

PCT International Search Report dated Apr. 3, 2003 corresponding to PCT/US02/37684 filed on Nov. 22, 2002.

* cited by examiner

Primary Examiner—F. L. Evans
Assistant Examiner—Kara Geisel
(74) Attorney, Agent, or Firm—Gray Cary Ware & Freidenrich LLP

(57) ABSTRACT

The present invention provides a method and apparatus for optical spectral power monitoring employing novel frequency-division-multiplexing detection schemes. The optical spectral power monitoring apparatus of the present invention uses a wavelength-dispersing means (e.g., a diffraction grating) to separate a multi-wavelength optical signal into multiple spectral channels, and an array of beam-modulating elements (e.g., micromirrors) positioned such that each beam-modulating element receives a unique one of the spectral channels. The beam-modulating elements are individually controllable such that the optical power levels of the spectral channels coupled into an output port carry distinct dither modulation signals. By performing a synchronous detection of the dither modulation signals, in conjunction with a predetermined calibration table, an optical power spectrum of the multi-wavelength optical signal can be derived. Such dither modulation signals may also be used as "identification markers" (or frequency tags) for identifying individual spectral channels in an optical networking application.

51 Claims, 10 Drawing Sheets

US 6,753,960 B1

OPTICAL SPECTRAL POWER MONITORS EMPLOYING FREQUENCY-DIVISION-MULTIPLEXING DETECTION SCHEMES

FIELD OF THE INVENTION

This invention relates generally to optical spectral monitors and analyzers. More specifically, it relates to a new class of optical spectral power monitors employing novel frequency-division-multiplexing detection schemes, which are well suited for WDM optical networking applications.

BACKGROUND

As optical communication networks employing wavelength division multiplexing (WDM) become increasingly pervasive, a new line of optical performance monitors, including spectral power monitors, is in demand.

Conventional optical spectral power monitors typically use a wavelength-dispersing means, such as a diffraction grating or a dispersing prism, to separate a multi-wavelength optical signal into a spatial array of spectral channels with distinct center wavelengths. An array of photo-detectors (e.g., photodiodes) is positioned to detect the spectral channels individually, thereby providing an optical power spectrum of the multi-wavelength optical signal. Alternatively, a rotating diffraction grating and a stationary photo-detector, or a movable photo-detector and a stationary diffraction grating, are used to scan the spectral channels sequentially. These prior spectral power monitors are typically high in cost, cumbersome in size and operation, and in some instances require considerable maintenance, rendering them unsuble for optical networking applications.

U.S. Pat. No. 5,631,735 of Nagai discloses a spectrometer that uses a diffraction grating for separating an incident light signal into respective wavelength components, impinging onto an array of optical shutter elements. The respective wavelength components are modulated with different frequencies, and subsequently multiplexed to one beam to be detected by a detector. The output signal of the detector is then demodulated in order to derive the intensity of the respective wavelength components.

It is known in the art that the diffraction efficiency of a diffraction grating is characteristically polarization sensitive, and may also be wavelength dependent. However, no effort is made in the aforementioned spectrometer of Nagai to mitigate such effects. Moreover, there may be other systematic effects in a practical system, inflicting additional optical loss to an optical beam. As such, the intensity measurement provided by Nagai's spectrometer is not reflective of the actual optical power level of the respective wavelength components in the input light signal.

U.S. Pat. No. 6,239,889 of Harley et al. discloses a scheme for optical signal power detection in a WDM system. A unique signature bit pattern is inserted in a digital optical signal, where the power level of the signature bit pattern is adjusted at the launching point to a predetermined ratio with the power level of the optical signal to be detected. At a point of interest, a fraction of the modulated optical signal is tapped off, and subsequently converted into an electrical signal. By extracting the fraction of the signature bit pattern from the electrical signal and measuring its power level, the power level of the optical signal can be determined. Such a scheme can also be extended to a plurality of optical signals multiplexed on an optical fiber, where each optical signal is given a unique signature pattern The aforementioned method of Harley et al. is limited in its application, in that the signature bit patterns have to be inserted on a network level, before any power detection can be made at the point of interest. Moreover, it requires that the predetermined ratio of the power level of the signature bit pattern to the power level of the optical signal be maintained as the optical signal propagates in the network, which might be a difficult proposition in practice.

Therefore, it would be an advance in the art to overcome the shortcomings of the foregoing devices and methods and to provide a new line of optical spectral power monitors that can be deployed anywhere in a WDM network and provide accurate detection of the WDM signals.

SUMMARY OF THE INVENTION

The present invention provides a method and apparatus for optical spectral power monitoring by way of a novel frequency-division-multiplexing detection scheme. The optical spectral power monitoring apparatus of the present invention comprises an input port for a multi-wavelength optical signal and an output port; a wavelength-disperser that separates the multi-wavelength optical signal by wavelength into multiple spectral channels having a predetermined relative arrangement; and an array of beam-modulating elements positioned such that each beam-modulating element receives a unique one of the spectral channels. The beam-modulating elements are individually controllable such that the optical power levels of the spectral channels coupled into the output port carry distinct dither modulation signals.

In the present invention, a "spectral channel" is characterized by a distinct center wavelength and associated bandwidth, and may carry a unique information signal as in WDM optical networking applications. A "dither modulation signal" refers to any modulation in the optical power level of a spectral channel that is caused by the corresponding beam-modulating element, in contrast with other "intrinsic" modulation signals (e.g., information signals) the input multi-wavelength optical signal may carry. Accordingly, the dither modulation signals are allocated in a spectral range that is sufficiently separated from the frequencies of other "intrinsic" modulation signals the spectral channels may carry.

In one embodiment of an optical spectral power monitoring apparatus of the present invention, an array of micromirrors serves as the beam-modulating elements; the output port acts as a spatial filter, such that misalignment in coupling a spectral channel to the output port effectively causes the optical power level of the spectral channel coupled into the output port to change. The micromirrors may be under control of a set of mirror-control (e.g., voltage) signals, such that at nominal positions the micromirrors reflect the corresponding spectral channels into the output port according to predetermined (e.g., maximum) coupling efficiencies. The micromirrors may be further pivoted about the respective nominal positions by way of alternating (or "dither") components in the corresponding mirror-control signals, whereby the optical power levels of the spectral channels coupled into the output port undergo distinct oscillations, hence the dither modulation signals. As such, the micromirrors thus described, along with the output port, effectively function as "spatial light modulators." The micromirrors may be provided by silicon micromachined mirrors that are each pivotable about at least one axis, for example. The output port may be a fiber collimator, an aperture, or other spatial filtering means known in the art.

Furthermore, an optical detector may be optically coupled to the output port, so as to convert the received optical power levels to a consolidated electrical signal, which carries the same characteristic dither modulation signals. A synchronous detection unit, in communication with the optical detector, may be used to detect the individual dither modulation signals in the consolidated electrical signal. The characteristics of the dither modulation signals thus detected, along with a predetermined calibration table that takes into account any systematic effect on a channel-by-channel basis, provide an optical power spectrum (i.e., optical power level as a function of wavelength) of the input multi-wavelength optical signal.

The aforementioned embodiment may further employ a polarization diversity scheme, so as to mitigate any polarization-dependent effect the constituent optical elements may possess. In this case, a polarization-separating element and a polarization-rotating element may be disposed along the optical path between the input port and the wavelength-disperser, serving to decompose the input multi-wavelength optical signal into first and second polarization components and subsequently rotating the polarization of the second polarization component by 90-degrees. The wavelength-disperser separates the incident optical signals by wavelength into first and second sets of optical beams, respectively. A beam-focuser (e.g., a focusing lens) may focus the first and second sets of optical beams into corresponding focused spots, impinging onto the micromirrors. Upon being reflected by the respective micromirrors and further multiplexed by the wavelength disperser, the reflected first and second sets of optical beams may be re-combined by way of a polarization-combining element in conjunction with an auxiliary polarization-rotating element, prior to being coupled into the output port.

The reflected first and second sets of optical beams may alternatively be coupled into the output port and an auxiliary output port, whereby the optical power levels coupled into each output port carry distinct dither modulation signals. First and second optical detectors may be optically coupled to the output port and the auxiliary output port, respectively. First and second synchronous detection units may be in communication with the first and second optical detectors and serve to detect the dither modulation signals associated with the first and second sets of optical beams, respectively. The characteristics of the dither modulation signals thus detected, combined with predetermined calibration tables, enable an optical power spectrum associated with each polarization component in the input multi-wavelength optical signal to be separately determined.

In another embodiment of the present invention, the beam-modulating elements are provided by an array of spatial light modulators known in the art, such as electro-optic intensity modulators, in a polarization diversity scheme. In this case, the first and second sets of optical beams dispersed by the wavelength-disperser impinge onto the corresponding electro-optic modulating elements, followed by a beam-reflector (e.g., a mirror). The electro-optic modulating elements may operate under control of a set of distinct alternating (or dither) control signals, so as to introduce dither modulation signals in the optical power levels of the optical beams. As such, upon a round-trip through the respective electro-optic modulating elements by way of the beam-reflector and further multiplexed by the wavelength-disperser, the first and second sets of optical beams may be directed into first and second optical detectors, respectively, whereby the optical power levels received by each optical detector carry distinct dither modulation signals. First and second synchronous detection units may be in communication with the first and second optical detectors and serve to detect the dither modulation signals associated with the first and second sets of optical beams, respectively. The characteristics of the dither modulation signals thus detected, combined with predetermined calibration tables, enable an optical power spectrum associated with each polarization component in the input multi-wavelength optical signal to be separately determined.

In the present invention, the wavelength-disperser may generally be a ruled diffraction grating, a holographic grating, an echelle grating, a curved diffraction grating, a transmission grating, a dispersing prism, or other types of wavelength-separating means known in the art. The input port may be a fiber collimator. The polarization-separating element may be a polarizing beam splitter, a birefringent beam displacer, or other types of polarization separating means known in the art. The polarization-rotating element may be a half-wave plate, a Faraday rotator, a liquid crystal rotator, or any other polarization-rotating means known in the art that is capable of rotating the polarization of an optical beam by 90-degrees. The polarization-combining element may be a birefringent element, e.g., a birefringent beam displacer operated in reverse. It may also be other means known in the art that is capable of combining two optical beams by way of polarization.

The optical spectral power monitoring apparatus of the present invention may further include one or more reference signals and corresponding reference-position-sensing elements, along with one or more appropriate alignment-adjusting elements, for monitoring the alignment between the spectral channels and the respective beam-modulating elements and correcting for shift in the alignment that may arise over the course of operation.

As such, the present invention provides an optical apparatus that is capable of introducing distinct dither modulation signals in multiple spectral channels in a frequency-division-multiplexed fashion. The distinct dither modulation signals enable the multiplexed spectral channels to be individually detected (e.g., by way of synchronous detection), whereby an optical power spectrum of the spectral channels can be derived. Such dither modulation signals may also be used as "identification markers" (or frequency tags) for identifying individual spectral channels in an optical networking application.

The novel features of this invention, as well as the invention itself, will be best understood from the following drawings and detailed description.

DETAILED DESCRIPTION

Figure 1A:
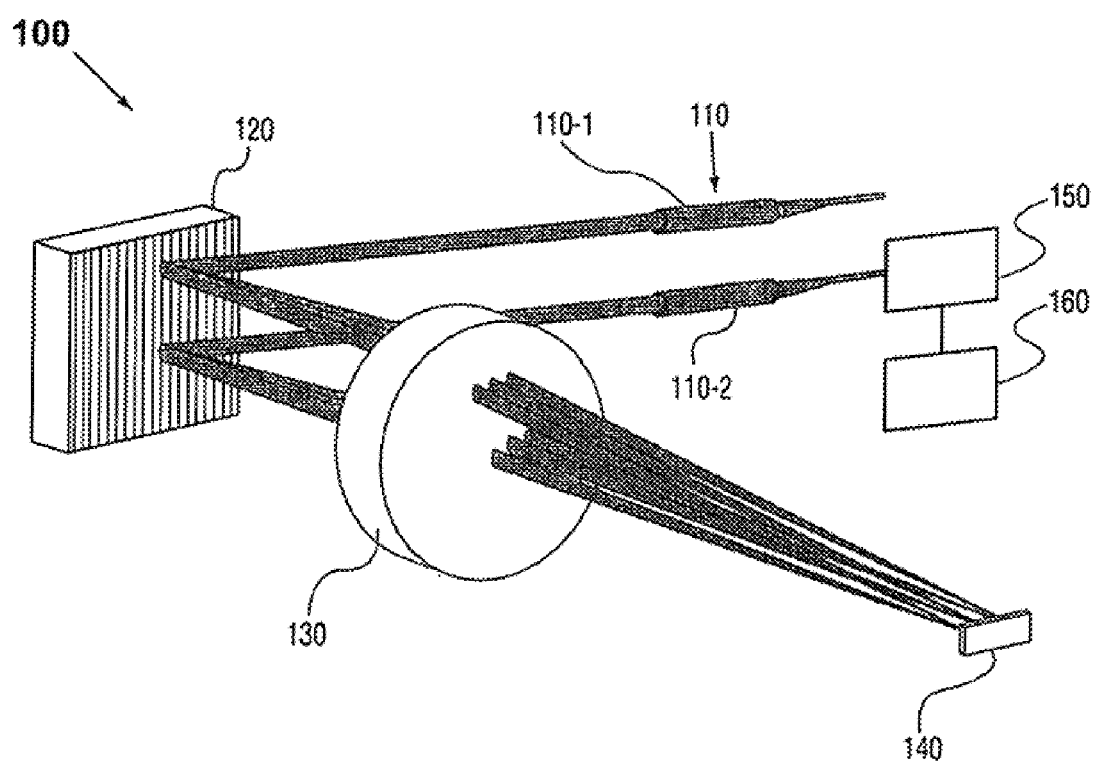
FIGS. 1A–1B show a first embodiment of an optical spectral power monitoring apparatus of the present invention, employing an array of micromirrors as the beam-modulating elements and a single output port.

FIG. 1A depicts a first embodiment of an optical spectral power monitoring apparatus according to the present invention. By way of example to illustrate the general principles and the architecture of the present invention, optical spectral power monitoring apparatus 100 comprises a plurality of input and output ports 110, including an input port 110-1 and an output port 110-2, which may be in the form of fiber collimators; a wavelength-disperser which in one form may be a diffraction grating 120; a beam-focuser in the form of a focusing lens 130; and an array of beam-modulating elements 140 which in one form may comprise micromirrors. The optical spectral power monitoring apparatus 100 may further include an optical detector 150 which in one form may be a photodiode along with associated detection circuit, and a synchronous-detection unit 160.

The principal operation of the optical spectral power monitoring apparatus 100 may be as follows. A multi-wavelength optical signal (e.g., containing wavelengths $\lambda_1$ through $\lambda_N$) emerges from the input port 110-1. The diffraction grating 120 angularly separates the incident multi-wavelength optical signal by wavelength into multiple spectral channels having a predetermined relative arrangement. The focusing lens 130 may in turn focus the spectral channels into corresponding focused spots (e.g., in a spatial array with the predetermined relative arrangement). The micromirrors 140 may be positioned such that each micromirror receives a unique one of the spectral channels. The micromirrors 140 are individually controllable and movable (e.g., pivotable or rotatable), such that, upon reflection, the spectral channels are multiplexed by the diffraction grating 120 and directed into the output port 110-2. The optical detector 150, optically coupled to the output port 110-2, converts the received spectral channels into a consolidated electrical (e.g., voltage) signal, which may subsequently be fed to the synchronous-detection unit 160, as will be discussed in further detail below.

In the present invention, a "spectral channel" is characterized by a distinct center wavelength (e.g., $\lambda_i$) and associated bandwidth, and may carry a unique information signal as in WDM optical networking applications. For purposes of illustration and clarity, only a selective few (e.g., three) of the spectral channels in the input multi-wavelength optical signal are graphically illustrated in FIG. 1A (and the following figures). It should be noted, however, that there can be any number of the spectral channels in an optical spectral power monitoring apparatus of the present invention (so long as the number of the spectral channels is commensurate with the number of the beam-modulating elements employed in the system). Moreover, the optical beams representing the spectral channels shown in FIG. 1A and the following figures are shown for illustrative purpose only. For instance, their sizes and shapes are not drawn to scale. It should be further noted that subscript i in this specification may assume any integer value between 1 and N.

Figure 1B:
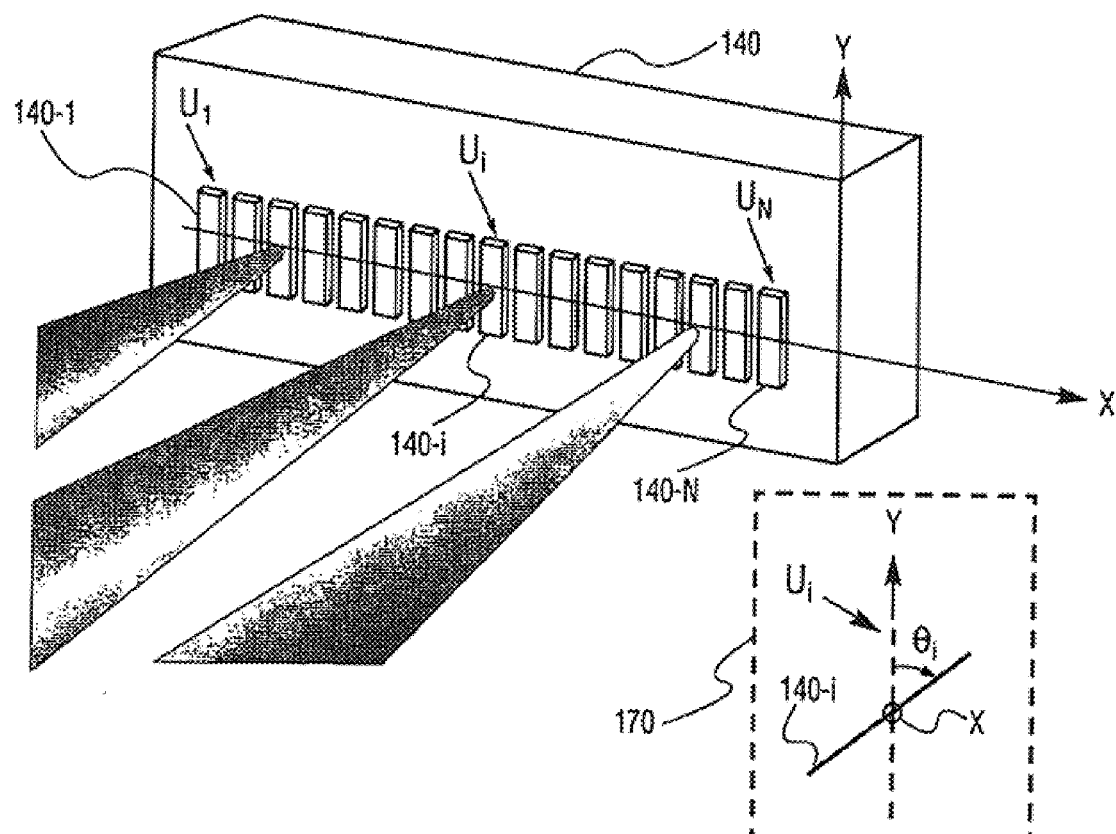

In the optical spectral power monitoring apparatus 100 of FIG. 1A, the diffraction grating 120, by way of example, may be oriented such that the focused spots of the spectral channels fall onto the micromirrors 140 in a horizontal array. Depicted in FIG. 1B is a schematic front view of the micromirrors 140 shown in the embodiment of FIG. 1A. As a way of example, the micromirrors 140 may be arranged in a one-dimensional array along the x-direction (i.e., the horizontal direction in the figure), so as to receive the focused spots of the spatially separated spectral channels in a one-to-one correspondence. (As in the case of FIG. 1A, only three spectral channels are illustrated, each represented by a converging beam). The reflective surface of each micromirror may lie in the x-y plane as defined in the figure and be movable, e.g., pivotable (or deflectable) about a horizontal axis such as the x-axis. Each spectral channel, upon reflection, may be deflected in the y-direction (e.g., downward) relative to its incident direction, so as to be directed into the output port 110-2 in FIG. 1A.

Figure 1C:
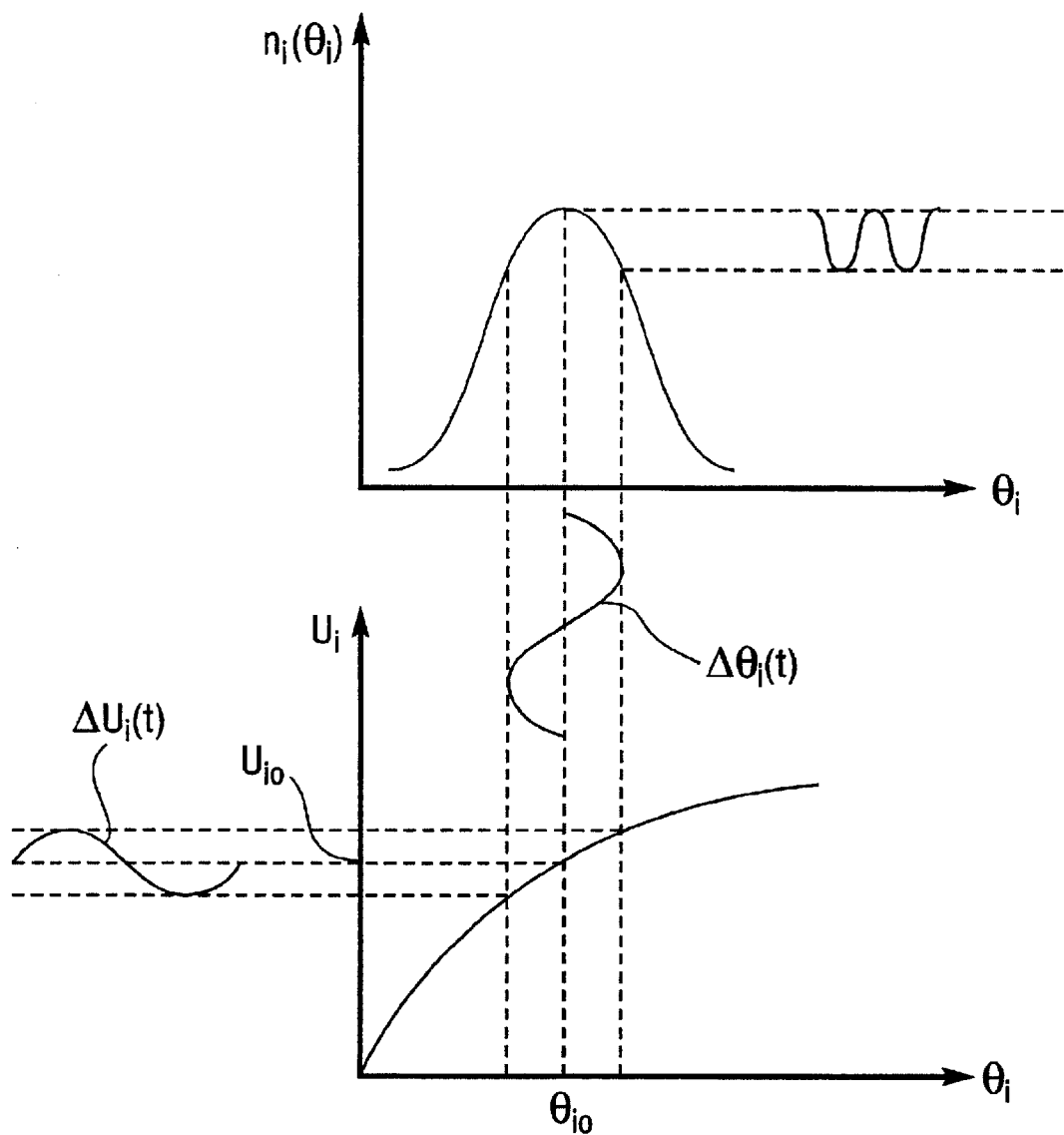
FIG. 1C illustrates an exemplary plot of coupling efficiency as a function of micromirror's pivoting angle and an exemplary plot of micromirror's pivoting angle as a function of mirror-control (voltage) signal.

In FIG. 1B, the micromirrors 140 are shown to be under control of a set of mirror-control signals, e.g., voltage signals $U_1$ through $U_N$. By way of example, dashed box 170 in FIG. 1B illustrates a schematic side view of the micromirror 140-i wherein the micromirror is shown to be subject to a mirror-control signal $U_i$, and consequently pivoting about the x-axis (pointing out of the plane of paper) at a pivoting angle $\theta_i$. Each micromirror may have a quadratic response to its voltage control signal. For instance, the pivoting angle $\theta_1$ of the micromirror 140-i may be proportional to $U_i^2$. FIG. 1C shows an exemplary plot of $\theta_i$ as a function of $U_i$, where for the sake of convenience, $\theta_i$ is plotted along a horizontal axis, whereas $U_i$ is plotted along a vertical axis. The ensuing description considers a situation where for each micromirror (e.g., the micromirror 140-i), only the pivoting motion in the positive angular range (i.e., $\theta_i > 0$) may be utilized. The general principles of the present invention, however, are not limited to this example; and in other alternative embodiments, any angular ranges may be used.

Also shown in FIG. 1C is an exemplary plot of coupling efficiency $\eta_i(\theta_i)$ of the spectral channel $\lambda_i$ into the output port 110-2 as a function of the pivoting angle $\theta_i$ of the corresponding micromirror 140-i. As used herein, the coupling efficiency for a spectral channel is defined as the ratio of the amount of optical power coupled to the fiber core (e.g., of a single-mode optical fiber) in the fiber collimator serving as the output port 110-2 to the total amount of optical power incident upon the entrance surface of the fiber. A notable feature of the coupling efficiency curve in FIG. 1C is that $\eta_i(\theta_i)$ displays a maximum value at a particular pivoting angle, e.g., $\theta_{io}$, as shown in the figure. The value of $\theta_{io}$ is generally intrinsic to the configuration of the system. In the event that the micromirrors 140 are configured to be parallel to each other in the absence of any control signal, $\theta_{io}$ may be substantially the same for all the spectral channels coupled into an output port (e.g., the output port 110-2 in FIG. 1A). It should be appreciated that the general shape of the coupling efficiency curve shown in FIG. 1C is characteristic of the coupling efficiency of any spectral channel under consideration.

Referring back to FIGS. 1A and 1B. The micromirrors 140 may be configured such that each micromirror, at a nominal position, directs the corresponding spectral channel into the output port 110-2 at the maximum coupling efficiency. For instance, the nominal position for the micromirror 140-i may correspond to the pivoting angle $\theta_i = \theta_{io}$. This nominal position may be established by a dc component $U_{io}$ in the mirror-control signal $U_i$ applied to the micromirror 140-i. As shown in FIG. 1C, the mirror-control signal $U_i$ may further contain an alternating (or "dither") component $\Delta U_i(t)$, for causing the micromirror 140-i to pivot (or oscillate) about its nominal position. By way of example, let $\Delta U_i(t)$ be a sinusoidal function of time, and the mirror-control signal $U_i$ for the micromirror 140-i accordingly be of the form, $$U_i = U_{io} + \Delta U_i(t) = U_{io} + \Delta U_i \cos(\omega_i t) \quad (1)$$

where $\Delta U_i$ and $\omega_i$ are the dither-amplitude and dither-angular-frequency of the dither component $\Delta U_i(t)$, respectively. Accordingly, the pivoting angle $\theta_i$ of the micromirror 140-i may be given by $$\theta_i(t) = \alpha U_i^2 = \theta_{io} + \theta_{i1} \cos(\omega_i t) + \theta_{i2} \cos(2\omega_i t) + \tfrac{1}{2}\alpha(\Delta U_1)^2 \quad (2)$$

where $\alpha$ is a proportionality constant, $\theta_{io} = \alpha U_{io}^2$ (also shown in FIG. 1C), $\theta_{i1} = 2\alpha\Delta U_i U_{io}$, and $\theta_{i2} = \tfrac{1}{2}\alpha(\Delta U_i)^2$. For small dither-amplitude, i.e., $\Delta U_i \ll U_{io}$, the terms in Eq. (2) that have a quadratic dependence on $\Delta U_i$ may be neglected. Eq. (2) thus reduces to $$\theta_i(t) = \theta_{io} + \theta_{i1} \cos(\omega_i t) \quad (3)$$

indicating that the micromirror has a nearly linear response to the dither component in its mirror-control signal. As a way of example to succinctly elucidate the principles of the present invention, the following discussion pertains to a situation where the micromirrors each operate in the linear manner as described by Eq. (3). The results thus obtained, along with the general principles of the present invention, are applicable to the more general case of Eq. (2), nonetheless.

The optical power level of the spectral channel $\lambda_i$ coupled into the output port 110-2 is proportional to the coupling efficiency depicted in FIG. 1C. Hence, as the pivoting angle $\theta_i$ of the micromirror 140-i varies (e.g., in a manner as shown in Eq. (2) or (3)), the optical power level of the spectral channel $\lambda_i$ coupled into the output port 110-2 undergoes periodic oscillations, termed the "dither modulation signal," herein. The variation of the pivoting angle $\theta_i$ as a function of time t may be expressed as $$\theta_i(t) = \theta_{io} + \Delta\theta_i(t) \quad (4)$$

where $\Delta\theta_i(t) = \theta_{i1} \cos(\omega_i t)$, in view of Eq. (3) above. If $P_i(\theta_i(t))$ represents the optical power level of the spectral channel $\lambda_i$ coupled into the output 110-2, expanding $P_i(\theta_i(t))$ about $\theta_i = \theta_{io}$ yields:

$$P_i(\theta_i(t)) = P_i(\theta_{io}) + \left.\frac{\partial P_i}{\partial \theta_i}\right|_{\theta_{io}} \Delta\theta_i + \left.\frac{\partial^2 P_i}{\partial^2 \theta_i}\right|_{\theta_{io}} (\Delta\theta_i)^2 + \ldots \quad (5)$$

$$= P_i(\theta_{io}) + [P_{i1}(\theta_{io})\theta_{i1}]\cos(\omega_i t) +$$

$$\left[\frac{1}{2}P_{i2}(\theta_{io})\theta_{i1}^2\right]\cos(2\omega_i t) + \ldots$$

where $$P_{i1}(\theta_{io}) = \left.\frac{\partial P_i}{\partial \theta_i}\right|_{\theta_{io}} \text{ and } P_{i2}(\theta_{io}) = +\left.\frac{\partial^2 P_i}{\partial^2 \theta_i}\right|_{\theta_{io}},$$

that is, the first-order and second-order derivatives of $P_i(\theta_i(t))$ at $\theta_i = \theta_{io}$, respectively. The optical detector 150 may further convert the optical power levels of the received spectral channels to a consolidated electrical signal, e.g., a consolidated voltage signal that is a superposition of voltage components resulting from the received optical power levels respectively. By way of example, the voltage component $V_i(\theta_i(t))$ originating from $P_i(\theta_i(t))$ of the spectral channels $\lambda_i$ may be expressed as $$V_i(\theta_i(t)) = V_{io}(\theta_{io}) + V_{i1}(\theta_{io})\cos(\omega_i t) + V_{i2}(\theta_{io})\cos(2\omega_i t) + \ldots \quad (6)$$

If the frequency response of the optical detector 150 is sufficiently uniform, it follows that $$V_{i1}(\theta_{io}) = \beta[P_{i1}(\theta_{io})\theta_{i1}]$$

$$V_{i2}(\theta_{io}) = \beta[\tfrac{1}{2}P_{i2}(\theta_{io})\theta_{i1}^2] \quad (7)$$

where $\beta$ is a predetermined constant, dependent upon the characteristics of the optical detector. The synchronous detection unit 160, in communication with the optical detector 150, may be set to detect one or more harmonic components (e.g., the terms associated with $\cos(\omega_i t)$ and $\cos(2\omega_i t)$) in Eq. (6) for each spectral channel.

Those skilled in the art will recognize that $P_{i1}(\theta_{io})$ and $P_{i2}(\theta_{io})$ described above are proportional to the first-order and second-order derivatives of the coupling efficiency $\eta_i(\theta_i)$ at $\theta_i = \theta_{io}$, respectively. As FIG. 1C indicates, at $\theta_i = \theta_{io}$, $\eta_i(\theta_i)$ is maximum, therefore its first-order derivative is zero and second-order derivative is at a minimum value at $\theta_i = \theta_{io}$. It follows that $P_{i1}(\theta_{io}) = 0$, hence $V_{i1}(\theta_{io}) = 0$, and $V_{i2}(\theta_{io}) = \beta[\tfrac{1}{2}P_{i2}(\theta_{io})\theta_{i1}^2]$. As such, the synchronous detection unit 160 may be set to detect the amplitudes of both the first and second harmonic components (e.g., $V_{i1}(\theta_{io})$ and $V_{i2}(\theta_{io})$) in Eq. (6), and the measurement of the first harmonic component (e.g., $V_{i1}(\theta_{io})$) may be used as a sensitive indicator of whether the nominal position of the micromirror is set at $\theta_i = \theta_{io}$.

To relate the measurements provided by the synchronous detection unit 160 to the optical power levels of the spectral channels in the input multi-wavelength optical signal, a calibration may be performed. In this process, calibration optical signals, characterized by substantially the same (center) wavelengths $\lambda_1$ through $\lambda_N$ as the spectral channels to be detected and having known input power levels $P_1^{calib}$ through $P_N^{calib}$, may be coupled into the input port 110-1. (The calibration optical signals may be provided by a tunable laser, for instance.) The calibration optical signals subsequently impinge onto the micromirrors 140 by way of the diffraction grating 120 and the focusing lens 130. The micromirrors 140, being controlled by the respective mirror-control signals each as shown in Eq.(1), direct the calibration optical signals into the output port 110-2. The optical detector 150 converts the received calibration optical signals to a consolidated calibration voltage signal, which is then fed to the synchronous unit 160. For example, the calibration optical signal $\lambda_i$ may have an input power level $P_i^{calib}$. The synchronous unit 160 detects the amplitudes of the first and second harmonic components (e.g., $V_{i1}^{calib}(\theta_{io})$ and $V_{i2}^{calib}(\theta_{io})$) in Eq. (6). In the event that the detected amplitude of the first harmonic component (e.g., $V_{i1}^{calib}(\theta_{io})$) is not zero, indicating that the nominal position of the micromirror 140-i may not be set at $\theta_{io}$, the dc component $U_{io}$ in Eq. (1) may be adjusted until the amplitude of the first harmonic component in Eq. (6) becomes zero (i.e., $V_{i1}^{calib}(\theta_{io}) = 0$), thereby ensuring that the nominal position of the micromirror 140-i is indeed maintained at the prescribed position $\theta_{io}$. The amplitude of the second harmonic component thus detected, $V_{i2}^{calib}(\theta_{io})$, is recorded. A calibration table, containing $P_i^{calib}$ versus $V_{i2}^{calib}(\theta_{io})$ for all the calibration optical signals involved, may then be constructed and stored in the system (e.g., within the synchronous detection unit 160).

Subsequently in the course of operation, the input multi-wavelength optical signal emerges from the input port 110-1, and the constituent spectral channels traverse substantially the same optical paths as the corresponding calibration optical signals during the calibration, while the micromirrors 140 are being controlled by the same set of the mirror-control signals as during the calibration. Accordingly, the synchronous detection unit 160 measures the amplitudes of the first and second harmonic components (e.g., $V_{i1}(\theta_{io})$ and $V_{i2}(\theta_{io})$) in Eq. (6) for each spectral channel. Upon ensuring that $V_{i1}(\theta_{io})=0$, $V_{i2}(\theta_{io})$ is recorded. As a result, the optical power level $P_i$ of the spectral channel $\lambda_i$ in the input multi-wavelength optical signal may be given by:

$$P_i = \frac{V_{i2}(\theta_{io})}{V_{i2}^{calib}(\theta_{io})} P_i^{calib} \qquad (8)$$

In the event that the input multi-wavelength optical signal occupies a frequency range that is substantially higher than the frequency range designated for the dither modulation signals, Eq. (8) yields a time-averaged optical power level of the spectral channel $\lambda_i$ in the input multi-wavelength optical signal. Conversely, if the input multi-wavelength optical signal is allocated in a frequency range that is substantially lower than the frequency range designated for the dither modulation signals, Eq. (8) effectively provides a "real-time" monitoring (or tracking) of the optical power level of the spectral channel $\lambda_i$ in the input multi-wavelength optical signal.

The synchronous detection unit 160 of FIG. 1A may include a signal processor designated for storing the aforementioned calibration table and deriving the optical power level of the respective spectral channels by use of Eq. (8), thereby providing an optical power spectrum (i.e., optical power level as a function of wavelength) of the input multi-wavelength optical signal. Those skilled in the art will appreciate that the above discussion, including Eqs. (1) through (8), applies to all the spectral channels of interest (i.e., the spectral channel $\lambda_i$ is merely used as an example in the above). Further, the result of Eq. (8), along with the aforementioned calibration procedure, is also applicable to a more general case where a micromirror's pivoting angle is described by Eq. (2) above.

It should be noted that by performing the aforementioned calibration, the details of the coupling efficiency curve for each spectral channel need not be known explicitly. The thus-described calibration also takes into account any systematic effect that may exist on a channel-by-channel (or wavelength-by-wavelength) basis, such as any optical loss a spectral channel may incur upon traversing from the input port 110-1 to the output port 110-2, without the need to measure such systematic effect separately. Furthermore, because the aforementioned calibration is performed on a channel-by-channel basis, the micromirrors 140 need not be configured and/or operated under identical conditions.

As such, a unique feature of the aforementioned embodiment of the present invention is that each micromirror, in conjunction with the output port 110-2, effectively functions as a "spatial light modulator." That is, each micromirror may be operated such to cause misalignment in coupling the corresponding spectral channel to the output port 110-2, which in turn gives rise to change in the optical power level of the spectral channel coupled into the output port 110-2, hence the dither modulation signal. By way of example, the output port 110-2 in FIG. 1A is shown to be in the form of a fiber collimator. It may alternatively be an aperture, or any other spatial filter known in the art that provides a spatial filtering of (or constriction to) the spectral channels reflected by the micromirrors. The micromirrors 140 above may be silicon micromachined mirrors, reflective ribbons (or membranes), or other types of beam-deflecting means known in the art. And each micromirror may be pivotable about at least one axis. What is important is that the micromirrors be individually controllable, so as to provide for the desired dither modulation signals. The underlying fabrication techniques for micromachined mirrors and associated actuation mechanisms are well documented in the art, see U.S. Pat. No. 5,629,790 for example, which is fully and completely incorporated by reference.

In the present invention, the term "dither modulation signal" generally refers to any modulation in the optical power level of a spectral channel that is caused by the corresponding beam-modulating element, in contrast with other "intrinsic" modulation signals the input multi-wavelength optical signal may carry. (For example, in optical networking applications, the spectral channels in the input multi-wavelength optical signal may each be modulated with a unique information signal.) Moreover, the dither modulation signals should be allocated in a spectral range that is sufficiently separated from the frequencies of other "intrinsic" modulation signals the spectral channels may carry.

The optical spectral monitoring apparatus 100 thus is capable of introducing distinct dither modulation signals in multiple spectral channels in a frequency-division-multiplexed fashion. The distinct dither modulation signals enable the multiplexed spectral channels to be individually detected (e.g., by way of synchronous detection), whereby an optical power spectrum of the spectral channels can be derived. Such dither modulation signals may also be used as "identification markers" (or frequency tags) for identifying individual spectral channels in an optical networking application.

One skilled in the art will recognize that in the above embodiments, the nominal position of a micromirror (e.g., the micromirror 140-i) need not necessarily correspond with the maximum value in the coupling efficiency of the corresponding spectral channel (e.g., the spectral channel $\lambda_i$). For instance, the nominal position of the micromirror 140-i may be set at a pivoting angle at which the coupling efficiency of the spectral channel $\lambda_i$ is situated on either side of the maximum value shown in FIG. 1C, if so desired in a practical application. In such a case, one of the harmonic components (e.g., the second harmonic component) in Eq. (6) may be used for determining the optical power level (in a manner similar to that described in Eq. (8)), whereas another harmonic component (e.g., the first harmonic component) in Eq. (6) may be used for ensuring the corresponding micromirror is maintained at the desired nominal position (or vice versa).

In the aforementioned embodiment, the synchronous detection unit 160 generally comprises electrical circuits and signal processing algorithms devised for performing synchronous detection of the dither modulation signals in the optical power levels of the spectral channels. For instance, it may employ multiple processors each designated to a particular dither modulation signal. It may also comprise a lock-in detector operated in a time-division-multiplexed sequence. From the teachings of the present invention, those skilled in the art will recognize that the dither components in the mirror-control signals applied to the micromirrors may be of other functional forms (in addition to the sinusoidal function of time as exemplified in Eq. (1) above), so long as the dither modulation signals thus produced in the optical power levels of the spectral channels contain mutually orthogonal components and the corresponding dither frequencies are allocated in a spectral range that is sufficiently separated from the frequencies of other "intrinsic" modulation signals the spectral channels may carry.

Figure 2:
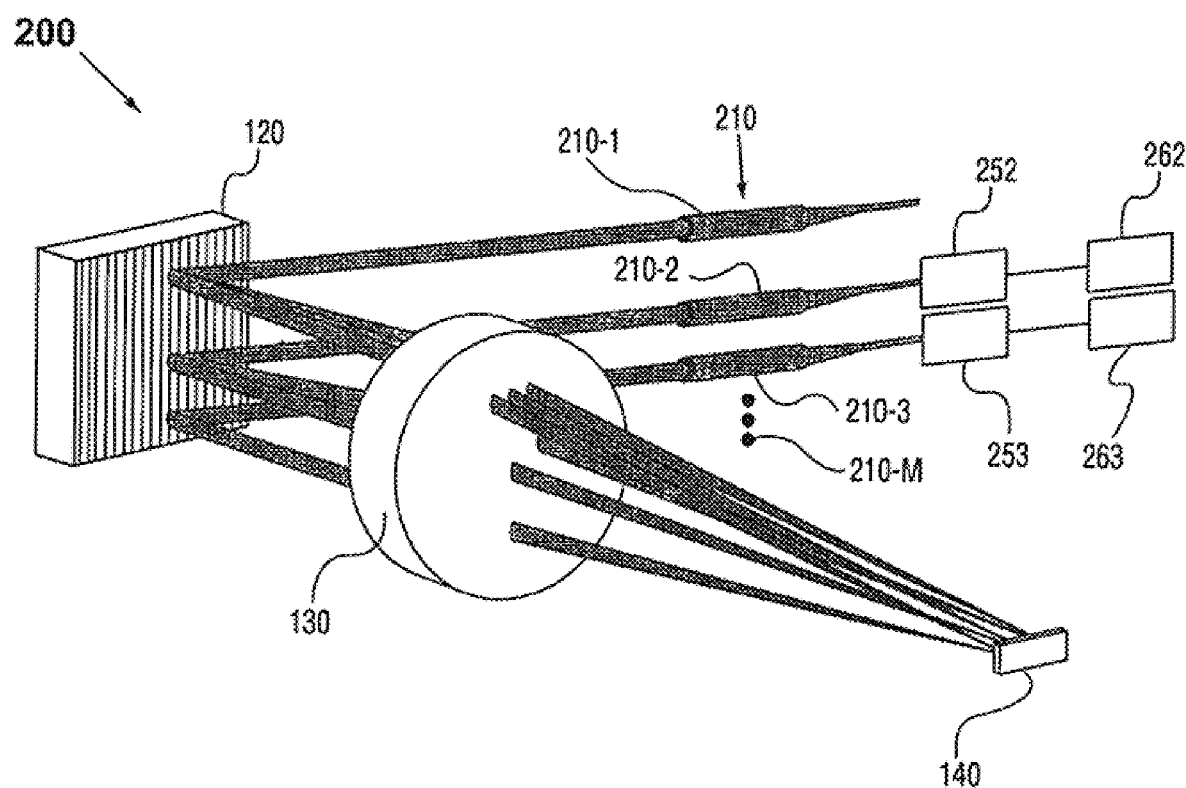
FIG. 2 depicts a second embodiment of an optical spectral power monitoring apparatus of the present invention, employing an array of micromirrors as the beam-modulating elements and a plurality of output ports.

The general principles of the present invention may also be applicable to a situation where it may be desired for the dither components in two (or more) mirror-control signals to share the same dither frequency. Consider the embodiment of FIG. 1B as a way of example. Assume that $\omega_1=\omega_i$ for the micromirrors 140-1, 140-i, $\omega_2=\omega_j$ for the micromirrors 140-2, 140-j, and $\omega_3=\omega_k$ for the micromirrors 140-3, 140-k, where the dither-angular-frequencies $\omega_1$, $\omega_2$, $\omega_3$ are mutually distinct (e.g., $\omega_1 \neq \omega_2 \neq \omega_3$), and the remaining dither-angular-frequencies are likewise mutually distinct. In such a scenario, the dither modulation signals in the optical power levels of the spectral channels $\lambda_1$, $\lambda_i$ no longer contain mutually orthogonal components, thus becoming "non-distinct". Likewise, the dither modulation signals associated with the spectral channels $\lambda_2$, $\lambda_j$, or those associated with the spectra channels $\lambda_3$, $\lambda_k$, are also "non-distinct". FIG. 2 depicts a second embodiment of an optical spectral power monitoring apparatus of the present invention, pertaining to this situation. By way of example, optical spectral power monitoring apparatus 200 makes use of the general, architecture along with a number of the elements used in the embodiment of FIG. 1A, as indicated by those elements labeled with identical numerals. This embodiment implements an array of input and output ports 210, including an input port 210-1 and a plurality of output ports 210-2 through 210-M ($M \geq 3$). As in the embodiment of FIG. 1A, each output port serves as a spatial filter, and is shown in the form of a fiber collimator by way of example. The micromirrors 140 may be operated such that the spectral channels $\lambda_1$, $\lambda_2$, $\lambda_3$ (carrying dither modulation signals characterized by the dither-angular-frequencies $\omega_1$, $\omega_2$, $\omega_3$) are coupled into a second output port 210-3, whereas the remaining spectral channels are coupled into a first output port 210-2 (or vice versa). This ensures that the optical power levels coupled into each output port carry distinct dither modulation signals. First and second optical detectors 252, 253 may be optically coupled to the first and second output ports 210-2, 210-3, respectively. First and second synchronous detection units 262, 263 may in turn be in communication the first and second optical detectors 252, 253, respectively. The detection of the dither modulation signals in each output port may be carried out in a manner substantially similar to that described with respect to FIG. 1A. First and second calibration processes may also be performed respectively with respect to the measurements provided by the first and second synchronous detection units 262, 263, in a manner substantially similar to that described above, so as to yield an optical power spectrum of the input multi-wavelength optical signal.

In the present invention, the dither components in the mirror-control signals may generally be classified into distinct "dither groups", wherein each dither group contains one or more dither components that are mutually orthogonal (e.g., the dither components may be characterized by sinusoidal functions of time with distinct frequencies, as exemplified above). The dither components in different dither groups need not necessarily be orthogonal (e.g., two dither components belonging to two dither groups may be characterized by sinusoidal functions of time with the same frequency). Accordingly, the number of the output ports implemented in an optical spectral power monitoring apparatus of the present invention should be commensurate with the number of the distinct dither groups devised for a given application, so as to ensure that the spectral channels coupled into each output port carry distinct dither modulation signals.

Figure 3A:
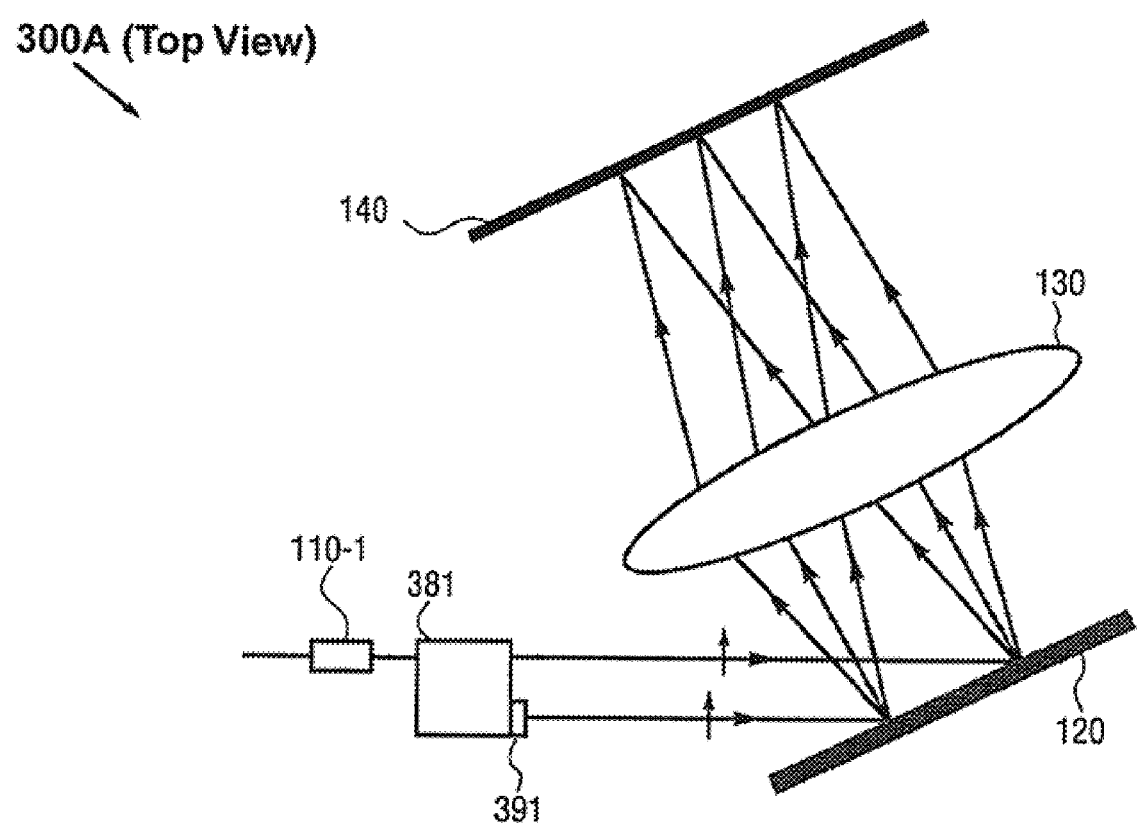
FIGS. 3A–3B show a third embodiment of an optical spectral power monitoring apparatus of the present invention, employing an array of micromirrors as the beam-modulating elements in a polarization diversity scheme.
Figure 3B:
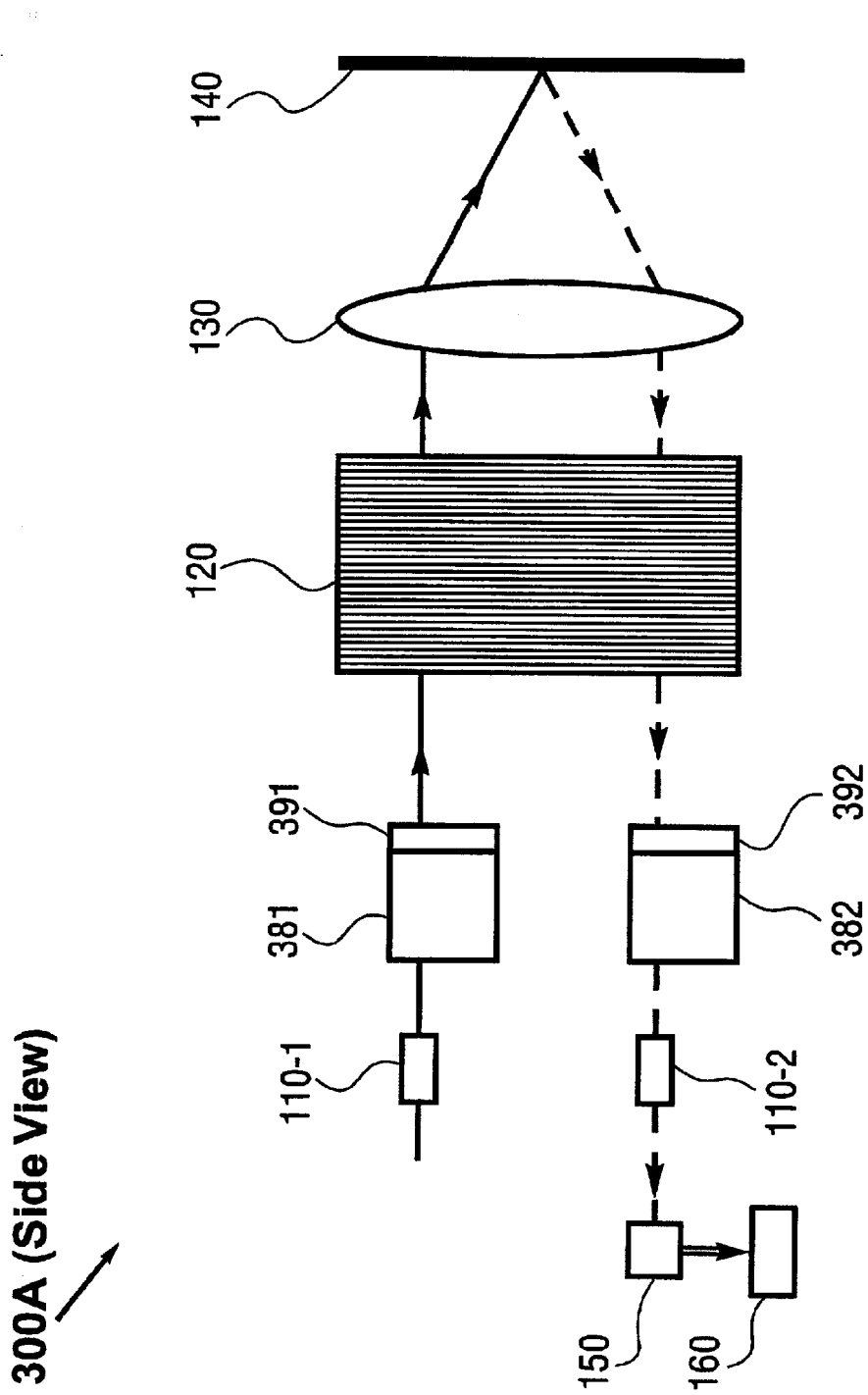
Figure 3C:
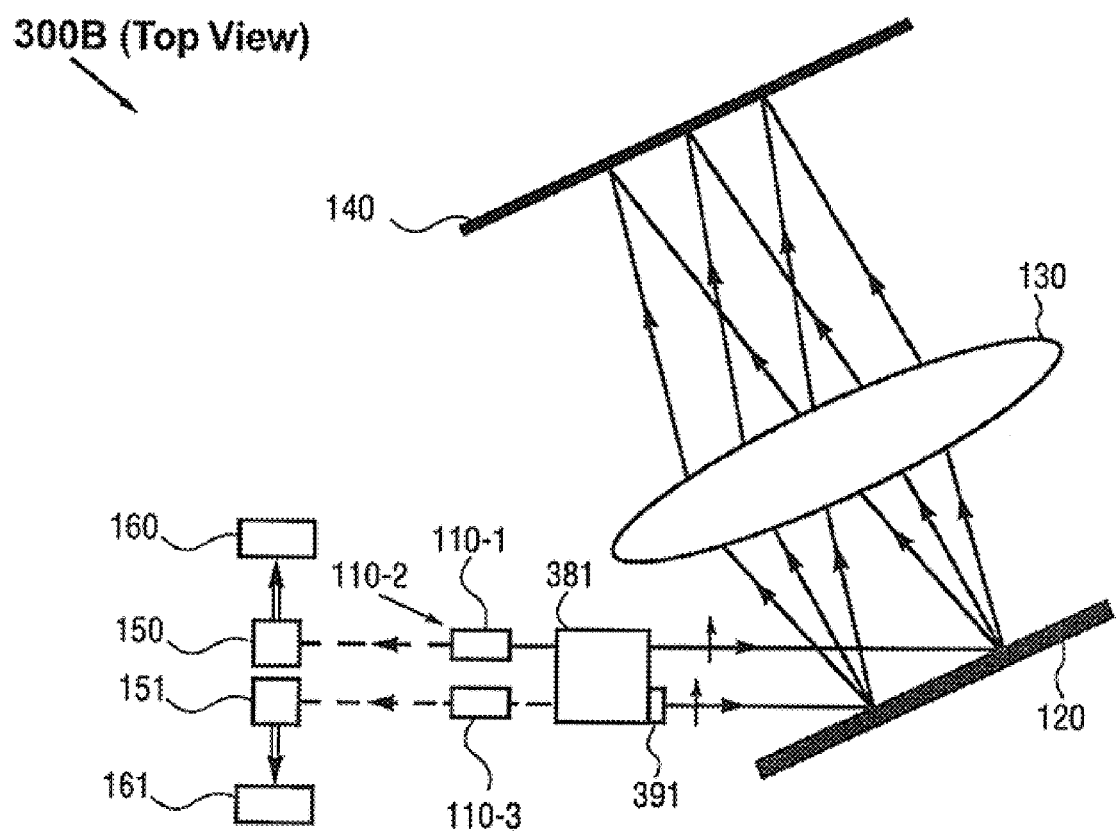
FIG. 3C shows a fourth embodiment of an optical spectral power monitoring apparatus of the present invention, employing an array of micromirrors as the beam-modulating elements in a polarization diversity scheme.

It is known that the diffraction efficiency of a diffraction grating may be polarization-dependent. For instance, the diffraction efficiency of a grating in a standard mounting configuration may be higher for p (or TM) polarization that is perpendicular to the groove lines on the grating than for s (or TE) polarization that is orthogonal to p-polarization, or vice versa. Such polarization-sensitive effects may become appreciable for a grating with a large number of groove lines (per unit length). In applications where such polarization-sensitive effects are deemed undesirable, a polarization diversity scheme may be implemented in the present invention. FIGS. 3A–3C depict third and fourth embodiments of an optical spectral power monitoring apparatus of the present invention, each employing an array of micromirrors as the beam-modulating elements in a polarization diversity scheme.

FIG. 3A is a schematic top view of a third embodiment of an optical spectral power monitoring apparatus of the present invention. By way of example, optical spectral power monitoring apparatus 300A may make use of the general architecture as well as a number of the elements used in the embodiment of FIG. 1A, as indicated by those elements labeled with identical numerals. In this case, a polarization-separating element 381 may be disposed along the optical path between the input port 110-1 and the diffraction grating 120, and serves to decompose the input multi-wavelength optical signal into a p-polarization component and an s-polarization component (or first and second polarization components). As a way of example, assuming that p-polarization is the preferred direction of the diffraction grating 120 (i.e., the diffraction efficiency is higher for p-polarization than for s-polarization), the s-polarization component may then be rotated by approximately 90-degrees by a polarization-rotating element 391, whereby the optical signals incident onto the diffraction grating 120 all possess p-polarization. It should be appreciated that while the polarization-rotating element will attempt rotate the s-polarization component by precisely 90-degrees, certain variations may be present in practice and will not significantly affect the overall performance of the invention. The diffraction grating 120 subsequently separates the incident optical signals by wavelength respectively into first and second sets of optical beams (wherein each group may contain optical beams with wavelengths $\lambda_1$ through $\lambda_N$, for instance). The focusing lens 130 may focus the first and second optical beams associated with the same wavelength (e.g., $\lambda_i$) onto the same micromirror (e.g., the micromirror 140-i in FIG. 1B).

FIG. 3B depicts a schematic side view of how the optical beams may traverse the optical spectral power monitoring apparatus 300A, where the incoming and reflected optical beams are shown in solid and dashed lines, respectively, for purpose of illustration. Upon being reflected by the respective micromirrors 140, the diffraction grating 120 multiplexes the reflected first and second sets of optical beams into first and second "returning" polarization components (corresponding to the original p-polarization and s-polarization components), respectively. An auxiliary polarization-rotating element 392 may rotate the polarization one of the returning polarization components (e.g., the first returning polarization component) by 90-degrees, such that the first and second returning polarization components are re-combined by way of traversing a polarization-combining element 382 (wherein the two constituent polarization components associated with each wavelength re-combine to form a single spectral channel), prior to being coupled into the output port 110-2.

In the embodiment of FIGS. 3A–3B, the micromirrors 140 may operate under a set of mirror-control signals similar to that described with respect to FIG. 1A. Accordingly, the optical power levels coupled into the output port 110-2 may carry the same characteristic dither modulation signals as described above. The detection of the dither modulation signals by way of the synchronous detection unit 160 in conjunction with the optical detector 150, and the determination of the optical power spectrum of the input multi-wavelength optical signal thus ensued, may be carried out in a manner substantially similar to that described with respect to FIG. 1A.

The embodiment of FIGS. 3A–3B may be further modified to provide an optical power spectrum for each polarization component in the input multi-wavelength optical signal, as illustrated in FIG. 3C. FIG. 3C is a schematic top view of a fourth embodiment of an optical spectral power monitoring apparatus of the present invention. By way of example, optical spectral power monitoring apparatus 300B may be built upon the embodiment of FIGS. 3A–3B, as indicated by the elements labeled with identical numerals. In this case, the second and first returning polarization components from the diffraction grating 120 may be coupled into the output port 110-2 (underneath the input port 110-1 in this schematic top view) and an auxiliary output port 110-3, respectively. This ensures that the optical power levels coupled into each output port carry distinct dither modulation signals. An auxiliary optical detector 151, along with an auxiliary synchronous detection unit 161, may be in communication with the auxiliary output port 110-3. The detection of the dither modulation signals in each output port may be carried out in a manner substantially similar to that described with respect to FIG. 1A. Furthermore, first and second calibration processes may be performed respectively with respect to the measurements provided by the synchronous detection units 160, 161, in a manner substantially similar to that described in FIG. 1A. As such, an optical power spectrum associated with each polarization component in the input multi-wavelength optical signal can be independently obtained in the embodiment of FIG. 3C.

Figure 4A:
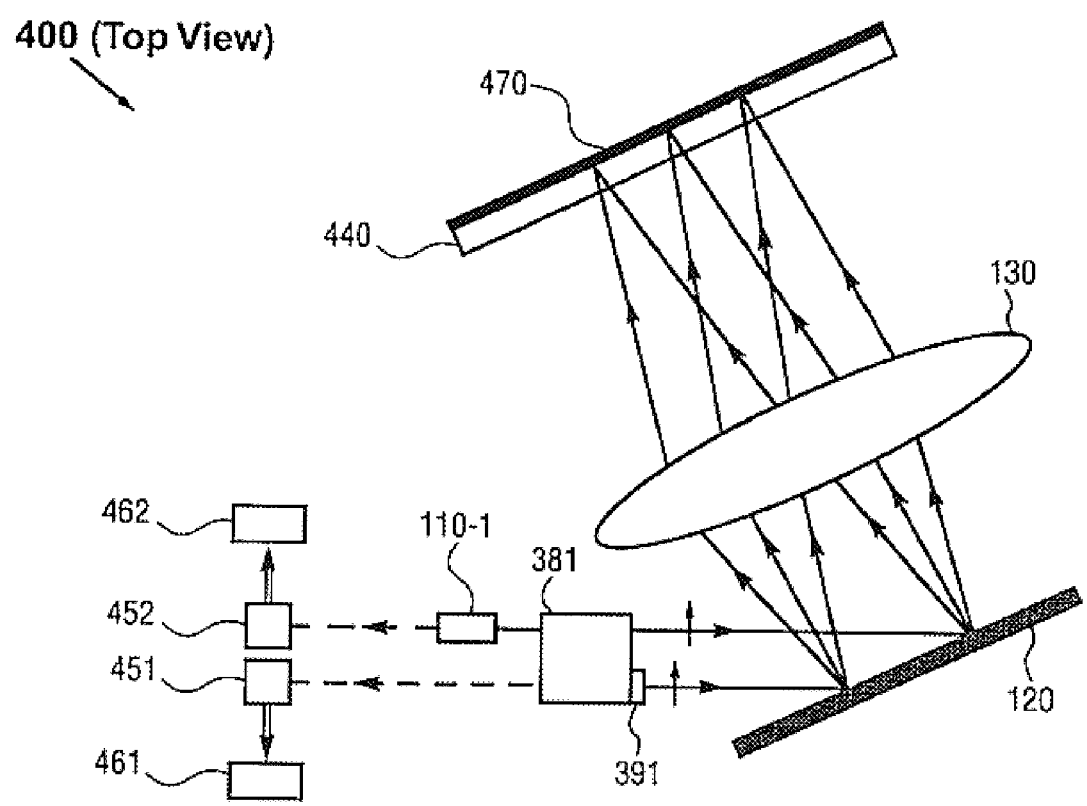
FIGS. 4A–4B depict a fifth embodiment of an optical spectral power monitoring apparatus of the present invention, employing an array of electro-optic modulating elements in a polarization diversity scheme.

The beam-modulating elements in the present invention may be alternatively provided by other types of spatial light modulators known in the art. By way of example, FIG. 4A shows a schematic top view of a fifth embodiment of an optical spectral power monitoring apparatus according to the present invention, employing an array of electro-optic modulating elements 440 in a polarization diversity scheme. Optical spectral power monitoring apparatus 400 may make use of the general architecture along with some of the elements employed in the embodiment of FIG. 3C, as indicated by those elements labeled with identical numerals. In this case, the polarization-separating element 381 may decompose the input multi-wavelength optical signal from the input port 110-1 into a p-polarization component and an s-polarization component (or first and second polarization components). In the event that p-polarization is the preferred direction of the diffraction grating 120 (i.e., the diffraction efficiency is higher for p-polarization than for s-polarization), the polarization-rotating element 391 may rotate the polarization of the s-polarization component (or the second polarization component) by 90-degrees. The diffraction grating 120 subsequently separates the incident optical signals by wavelength respectively into first and second sets of optical beams (wherein each set contains optical beams with wavelengths $\lambda_1$ through $\lambda_N$, for instance). The focusing lens 130 may focus the diffracted optical beams onto an array of beam-modulating elements 440 which may comprise electro-optic intensity modulating elements and which may be followed by a beam-reflector 470 (e.g., a mirror). The first and second optical beams associated with the same wavelength (e.g., $\lambda_i$) may impinge on the same modulating element.

Figure 4B:
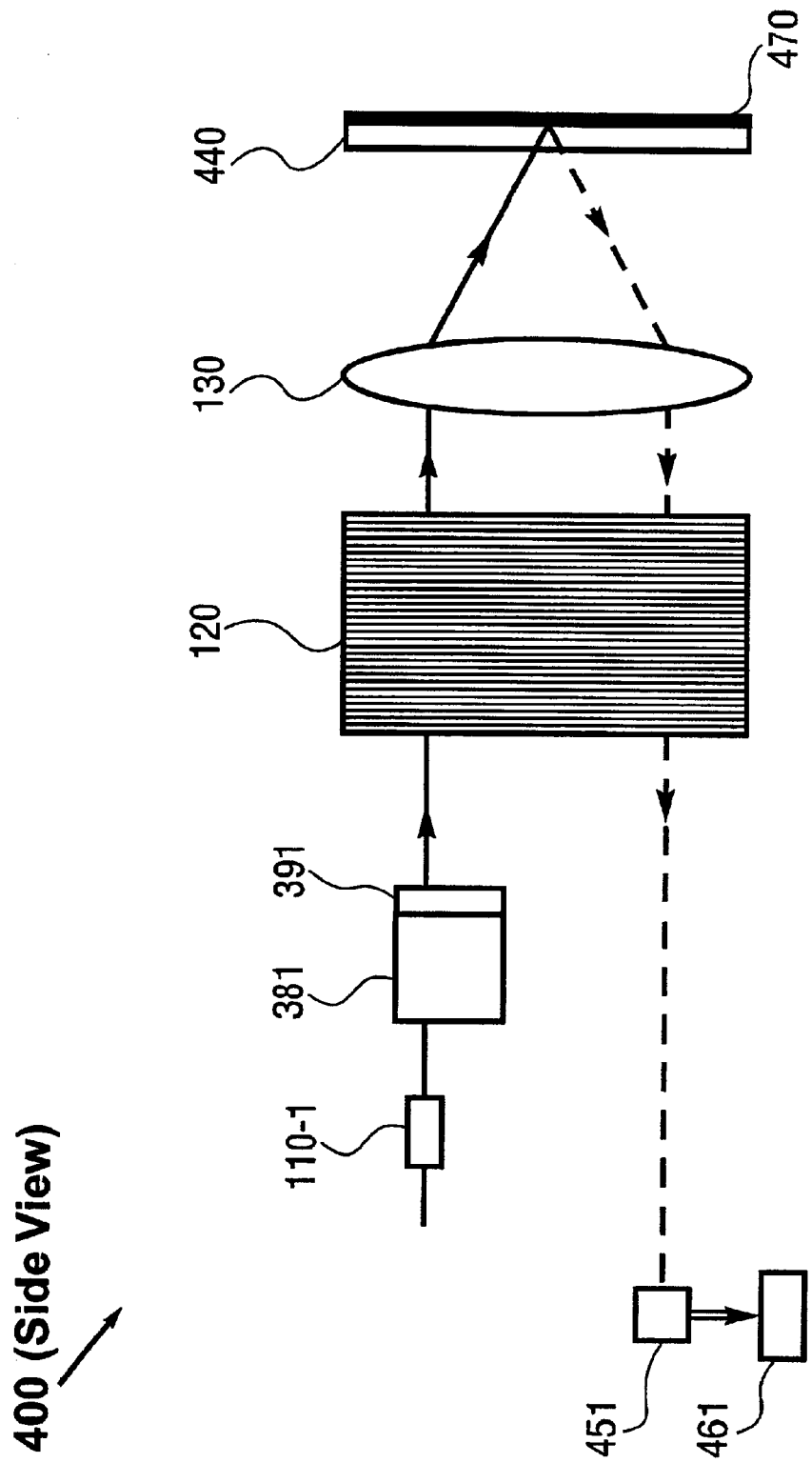

The electro-optic modulating elements 440 may operate under control of a set of distinct alternating (or dither) control signals, which in one form may be sinusoidal functions of time at a set of distinct frequencies. Each modulating element may be configured such to introduce a dither modulation signal in the optical power level of a corresponding optical beam that includes a substantially linear response to the control signal to which it is subject. As such, upon a round-trip through the respective electro-optic modulating elements 440 by way of the beam-reflector 470, and further multiplexed by the diffraction grating 120, the first and second sets of optical beams may be directed into first and second optical detectors 451, 452 respectively, such that the optical power levels received by the respective first and second optical detectors 451, 452 carry distinct dither modulation signals. In FIG. 4A and FIG. 4B as follows, the incoming and reflected optical beams are shown in solid and dashed lines, respectively; for purpose of illustration.

FIG. 4B shows a schematic side view of how the optical beams traverse the optical spectral power monitoring apparatus 400. By way of example, only the first polarization component of the input multi-wavelength optical signal and subsequently the first set of optical beams are explicitly shown. A first synchronous detection unit 461, in communication with the first optical detector 451, serves to detect the dither modulation signals associated with the first set of optical beams. Likewise, a second synchronous detection unit 462 (see FIG. 4A) may be in communication with the second optical detector 452 (see FIG. 4A), for detecting the dither modulation signals associated with the second set of optical beams. As in the case of FIG. 3C, first and second calibration processes may be performed respectively with respect to the measurements provided by the first and second synchronous detection units 461, 462, such that an optical power spectrum associated with each polarization component in the input multi-wavelength optical signal can be independently determined.

In the embodiment of FIGS. 4A–4B, the first and second sets of optical beams, upon being multiplexed by the diffraction grating 120, may also be coupled into first and second output ports (e.g., in a manner as depicted in FIG. 3C), if so desired in a practical application. The first and second output ports may in turn be coupled to first and second optical detectors, which are in communication with first and second synchronous units, respectively. Alternatively, the first and second sets of optical beams, upon being multiplexed by the diffraction grating 120, may be re-combined (e.g., in a manner as depicted in FIGS. 3A–3B), prior to be directed into an optical detector (or an output port).

In the present invention, an electro-optic modulating element may be a liquid crystal based intensity modulator known in the art, or any other electro-optic intensity modulator known in the art, capable of modulating the optical power level of an optical beam in such a way that the modulation thus produced includes a substantially linear response to the control signal applied to the modulating element. The polarization-separating element 381 may be a polarization beam splitter, a birefringent beam displacer, or other types of polarization-separating means known in the art. The polarization-rotating element 391, or the auxiliary polarization-rotating element 392, may be a half-wave plate, a Faraday rotator, a liquid crystal rotator, or any other polarization-rotating means known in the art that is capable of rotating the polarization of an optical beam by 90-degrees. The polarization-combining element 382 may be a birefringent element, e.g., a birefringent beam displacer operated in reverse. It may also be other means known in the art that is capable of combining two optical beams by way of polarization.

Moreover, the wavelength-disperser in the present invention may generally be a ruled diffraction grating, a holographic diffraction grating, an echelle grating, a transmission grating, a dispersing prism, or other types of wavelength-separating means known in the art. The beam-focuser may generally be an assembly of one or more focusing lenses, or other types of beam-focusing means known in the art. The focusing function may also be accomplished by using a curved diffraction grating that performs a dual function of wavelength-separating and beam-focusing. The input port may be a fiber collimator, e.g., in the form of a collimating lens (such as a GRIN lens) and a ferrule-mounted fiber packaged together in a mechanically rigid stainless steel (or glass) tube. For the ease of alignment, the fiber collimators serving as the input and output ports in any of the above embodiments may be conveniently mounted along a V-groove fabricated on a substrate made of silicon, plastic, or ceramic, as commonly practiced in the art. The optical detector may be a PN photo detector, a PIN photo detector, an avalanche photo detector (APD), or other types of optical power sensing means known in the art. As will be appreciated from the teachings of this specification, one skilled in the art will know how to design a suitable optical spectral power monitoring apparatus according to the present invention, for a given application.

Figure 5:
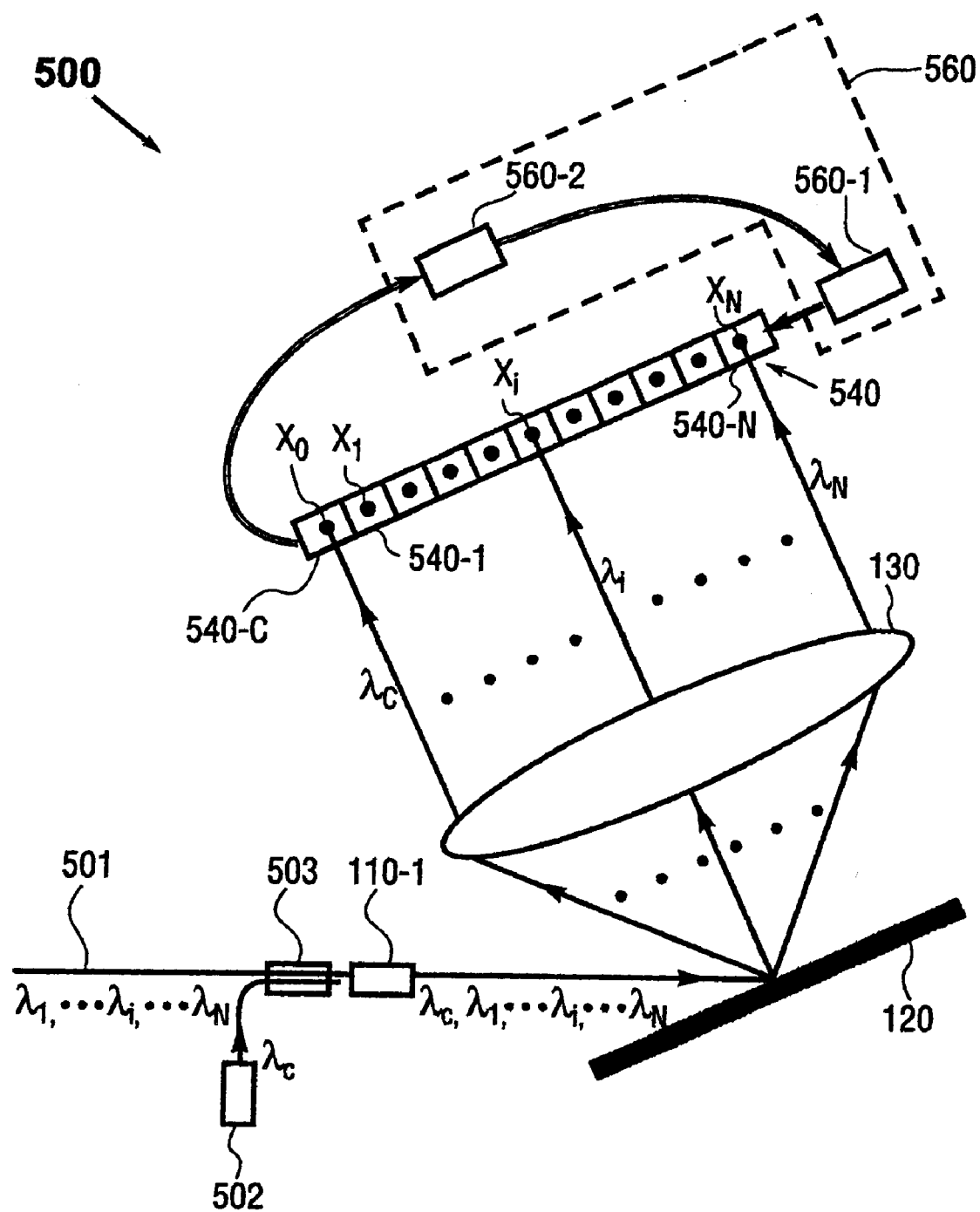
FIG. 5 shows a sixth embodiment of an optical spectral power monitoring apparatus of the present invention, illustrating how to ascertain optimal alignment in the present invention.

To ensure the requisite alignment between the spectral channels and the respective beam-modulating elements (i.e., the micromirrors 140 in FIG. 1A or the electro-optic modulating elements 440 in FIG. 4A), an optical spectral power monitoring apparatus of the present invention may make use of one or more reference signals and corresponding reference-position-sensing elements, along with appropriate alignment-adjusting elements, to monitor the alignment between the spectral channels and the underlying beam-modulating elements and to correct for shift in the alignment that may occur over the course of operation. FIG. 5 depicts a schematic top view of a sixth embodiment of an optical spectral power monitoring apparatus of the present invention. By way of example to illustrate the general principles of the present invention, optical spectral power monitoring apparatus 500 may make use of the general architecture along with a number of the elements used in the embodiment of FIG. 1A, as indicated by those elements labeled with identical numerals. The following description will use this system as an example to illustrate how best to ascertain and further maintain the requisite alignment between the spectral channels and the underlying beam-modulating elements. The operation of the embodiment of FIG. 5 as an optical spectral power monitoring device may be substantially as described in any one of the above embodiments. (Hence, some of the elements depicted in the aforementioned embodiments, such as the output port(s) and/or optical detector(s), are not explicitly shown in FIG. 5.)

In the optical spectral power monitoring apparatus 500, the input port 110-1 transmits a multi-wavelength optical signal containing wavelengths $\lambda_1$ through $\lambda_N$ along with reference signal containing wavelength $\lambda_c$. The diffraction grating 120 angularly separates the incident multi-wavelength optical signal along with the reference signal by wavelength into multiple spectral channels $\lambda_1$ through $\lambda_N$ and a reference spectral component $\lambda_c$ having a predetermined relative arrangement. The focusing lens 130 may focus the reference spectral component and the spectral channels into corresponding focused spots, e.g., in a predetermined spatial array (termed "spectral array" herein) with the predetermined relative arrangement. An optical-element array 540, including a reference-position-sensing element 540-C and a plurality of beam-modulating elements 540-1 through 540-N (e.g., the micromirrors 140 in FIG. 1A), may be positioned such that when the reference spectral component $\lambda_c$ impinges onto the reference-position-sensing element 540-C at a predetermined location $x_o$, the spectral channels $\lambda_1$ through $\lambda_N$ impinge onto the beam-modulating elements 540-1 through 540-N at designated locations $x_1$ through $x_N$. This provides a simple and effective way to align the spectral channels with the respective beam-modulating elements. The optical-element array 540 may be integrated into a single structure, e.g., by mounting and/or fabricating the constituent optical elements on a substrate. It should be appreciated that the focused spots of the diffracted optical beams impinging onto the optical-element array 540 may be unevenly spaced.

The optical spectral monitoring apparatus 500 of FIG. 5 may further comprise an alignment-adjusting element 560-1 which in one form may be an actuation device coupled to the optical-element array 540, for causing the optical-element array 540 as a whole—therefore the reference-position-sensing element 540-C and the beam-modulating elements 540-1 through 540-N in tandem—to move, e.g., translate and/or rotate, thereby adjusting a relative alignment between the spectral array formed by the diffracted optical beams and the underlying optical-element array. The optical spectral power monitoring apparatus 500 of FIG. 5 may additionally include a processing element 560-2, for monitoring the real-time impinging position of the reference spectral component $\lambda_c$ on the reference-position-sensing element 540-C and for controlling the actuation device 560-1 accordingly, so as to ensure that the reference spectral component $\lambda_c$ stays aligned at the predetermined location $x_o$ and therefore the spectral channels $\lambda_1$ through $\lambda_N$ stay aligned at the designated locations $x_1$ through $x_N$. The thus-described alignment-monitoring-adjusting process may be carried out periodically, or continuously by way of servo-control. (In the latter scenario, the actuation device 560-1 and the processing element 560-2 constitute a servo-control unit 560.) As such, the optical spectral power monitoring apparatus 500 is capable of actively correcting for shift in the alignment that may occur over the course of operation (e.g., due to environmental effects such as thermal and/or mechanical disturbances), and therefore is more robust in performance.

In the embodiment of FIG. 5, the reference-position-sensing element 540-C may be a position sensitive detector, a quadrant detector, a split detector, or any other position-sensitive means known in the art, which allows the real-time impinging position (in one or two dimensions) of an optical beam to be monitored by way of electrical (e.g., current or voltage) signals produced by the sensing element. Alternatively, it may comprise two "reference-beam-modulating elements", which may be substantially similar to the beam-modulating elements employed in the system in configuration and operation. The reference-beammodulating elements may be operated such to introduce two distinct "reference dither modulation signals" in the optical power level of the corresponding reference spectral component $\lambda_c$. By detecting the reference dither modulation signals using an appropriate differential detection scheme known in the art, the impinging position of the reference spectral component $\lambda_c$ can be deduced.

Furthermore, the actuation device 560-1 may be a voice coil actuator, a stepping motor, a solenoid actuator, a piezoelectric actuator, or other types of actuation means known in the art. The processing element 560-2 may include electrical circuits, controllers and signal processing algorithms for processing the output signals received from the reference-position-sensing element 540-C and deriving from the detected signals the real-time impinging position of the reference spectral component $\lambda_c$. The processing element 560-2 accordingly generates appropriate control signals to be applied to the actuation device 560-1.

A skilled artisan will appreciate that instead of (or in conjunction with) of moving the optical-element array 540 relative to the spectral array as described above, the focusing lens 130 in FIG. 5 may be alternatively (or additionally) moved (e.g., translated or rotated), thereby performing a similar alignment function. From the teachings of the present invention, those skilled in the art will further appreciate that one or more auxiliary reference signals and corresponding reference-position-sensing elements, along with suitable alignment-adjusting elements, may be additionally employed in an optical spectral power, monitoring apparatus of the present invention to complement the aforementioned function of the reference spectral component $\lambda_c$.

In the present invention, one or more reference signals may generally be any optical signals with well-defined and stable center wavelengths that do not substantially coincide with any of the wavelengths of the spectral channels under consideration. By way of example, the reference signal in FIG. 5 is shown to have a wavelength $\lambda_c$ that is shorter (or longer) than any of the wavelengths of the spectral channels. In general, the spectral channels need not be evenly spaced in wavelength (or frequency).

In the embodiment of FIG. 5, the multi-wavelength optical signal containing wavelengths $\lambda_1$ through $\lambda_N$ may be provided by an input optical fiber 501 coupled to the fiber collimator that serves as the input port 110-1. The reference signal $\lambda_c$ may be provided by a reference light source 502, which may be a distributed feedback (DFB) laser, a Fabry-Perot (FP) laser (in conjunction with an appropriate modulation/control system that serves to suppress the mode hopping and stabilizes the output signal), or any other light source known in the art that can provide an appropriate reference signal with well-defined and stable wavelength. An optical combiner 503 (e.g., a fiber-optic fused coupler) may be used to couple the reference light source 502 to the input optical fiber 501, effective to direct both the multi-wavelength optical signal and the reference signal into the input port 110-1. The optical spectral power monitoring apparatus 500 thus has an independent, internal reference light source. (In the event that one or more auxiliary reference signals are employed in the present invention, one or more auxiliary reference light sources may be coupled to the input fiber 501 by one or more auxiliary optical combiners in a similar manner; or a single reference light source capable of providing a plurality of distinct reference signals may be implemented, in lieu of the reference light source 502.) Alternatively, the multi-wavelength optical signal itself may include one or more spectral components (e.g., one or more service channels in an optical network) that can serve as one or more reference signals, as in WDM optical networking applications. In such scenario, the internal reference light source 502 along with the optical combiner 503 need not be implemented.

Those skilled in the art will recognize that the exemplary embodiments described above provide only a few of many optical spectral power monitoring systems that can be constructed according to the present invention. Various means and methods can be devised to perform the designated functions in an equivalent manner. Moreover, various changes, substitutions, and alternations can be made herein without departing from the principles and the scope of the present invention. Accordingly, the scope of the present invention should be determined by the following claims and their legal equivalents.

What is claimed is:

1. An optical apparatus, comprising:
    a) an input port, providing a multi-wavelength optical signal;
    b) an output port;
    c) a wavelength-disperser that separates said multi-wavelength optical signal by wavelength into multiple spectral channels having a predetermined relative arrangement; and
    d) an array of micromirrors positioned such that each micromirror receives a unique one of said spectral channels, said micromirrors being individually pivotable such that optical power levels of said spectral channels coupled into said output port carry distinct dither modulation signals.

2. The optical apparatus of claim 1 further comprising an optical detector, optically coupled to said output port, wherein said optical detector converts said optical power levels into an electrical signal.

3. The optical apparatus of claim 2 further comprising a synchronous detection unit, in communication with said optical detector, wherein said synchronous detection unit detects from said electrical signal said dither modulation signals in said optical power levels.

4. The optical apparatus of claim 3 further comprising a signal processor, containing a predetermined calibration table, said signal processor deriving an optical power spectrum of said multi-wavelength optical signal from said dither modulation signals.

5. The optical apparatus of claim 2 wherein said optical detector comprises a photodiode in conjunction with an associated detection circuit.

6. The optical apparatus of claim 1 wherein said output port comprises a spatial filter, configured such that as said micromirrors are pivoted about respective nominal positions by a set of mirror-control signals, said dither modulation signals are produced in said optical power levels.

7. The optical apparatus of claim 6 wherein said optical power levels of said spectral channels coupled into said spatial filter are at respective maximum values when said micromirrors are at said nominal positions.

8. The optical apparatus of claim 6 wherein said mirror-control signals include dither components, said dither components being mutually orthogonal functions of time.

9. The optical apparatus of claim 6 wherein said mirror-control signals include dither components, classified in a plurality of distinct dither groups, wherein each dither group contains dither components that are mutually orthogonal functions of time, and wherein said optical apparatus further comprises one or more auxiliary spatial filters, such that said spectral channels coupled into each spatial filter carry distinct dither modulation signals.

10. The optical apparatus of claim 6 wherein said spatial filter comprises an element selected from the group consisting of fiber collimators and apertures.

11. The optical apparatus of claim 1 wherein said micromirrors comprise silicon micromachined mirrors.

12. The optical apparatus of claim 1 wherein said wavelength-disperser comprises an element selected from the group consisting of ruled diffraction gratings, holographic diffraction gratings, echelle gratings, curved diffraction gratings, transmission gratings, and dispersing prisms.

13. The optical apparatus of claim 1 further comprising a beam-focuser for focusing said spectral channels into corresponding focused spots that impinge onto said micromirrors.

14. The optical apparatus of claim 1 further comprising a reference signal, emerging from said input port along with said multi-wavelength optical signal, wherein said wavelength-disperser directs a reference spectral component of said reference signal to a predetermined location on a reference-position-sensing element.

15. The optical apparatus of claim 14 wherein said reference-position-sensing element comprises an element selected from the group consisting of position sensitive detectors, quadrant detectors, and split detectors.

16. The optical apparatus of claim 14 wherein said reference-position-sensing element comprises two reference-beam-modulating elements, configured to introduce distinct reference dither modulation signals in an optical power level of said reference spectral component.

17. The optical apparatus of claim 14 wherein said input port comprises a fiber collimator coupled to an input optical fiber, wherein said optical apparatus further comprises an optical combiner for coupling a reference light source to said input optical fiber, and wherein said input optical fiber transmits said multi-wavelength optical signal and said reference light source provides said reference signal.

18. The optical apparatus of claim 14 further comprising an alignment-adjusting element for adjusting an alignment between said spectral channels and said micromirrors.

19. The optical apparatus of claim 18 wherein said beam-modulating elements and said reference-position-sensing element form an optical-element array, and wherein said alignment-adjusting element comprises an actuation device coupled to said optical-element array, for causing said optical-element array to move.

20. The optical apparatus of claim 19 further comprising a processing element in communication with said alignment-adjusting element and said reference-position-sensing element, wherein said processing element monitors an impinging position of said reference spectral component onto said reference-position-sensing element and provides control of said alignment-adjusting element accordingly, so as to maintain said reference spectral component at said predetermined location, thereby ensuring a requisite alignment between said spectral channels and said beam-modulating elements.

21. The optical apparatus of claim 1 wherein said input port comprises a fiber collimator.

22. The optical apparatus of claim 21 wherein said output port comprises a fiber collimator.

23. An optical apparatus, comprising:
a) an input port, providing a multi-wavelength optical signal;
b) first and second output ports;
c) a polarization-separating element that decomposes said multi-wavelength optical signal into first and second polarization components;
d) a polarization-rotating element that rotates a polarization of said second polarization component by approximately 90-degrees;
e) a wavelength-disperser that separates said first and second polarization components by wavelength into first and second sets of optical beams, respectively;
f) a beam-focuser that focuses first and second sets of optical beams into corresponding focused spots; and
g) an array of beam-modulating elements configured to direct said first and second sets of optical beams into said first and second output ports, respectively, said beam-modulating elements being individually controllable such that optical power levels of said first and second sets of optical beams coupled respectively into said first and second output ports carry distinct dither modulation signals.

24. The optical apparatus of claim 23 further comprising first and second optical detectors, optically coupled to said first and second output ports, respectively.

25. The optical apparatus of claim 24 further comprising first and second synchronous detection units in communication with said first and second optical detectors, respectively.

26. The optical apparatus of claim 23 wherein said beam-modulating elements comprise micromirrors and said first and second output ports comprise first and second spatial filters, configured such that as said micromirrors are pivoted about respective nominal positions by a set of mirror-control signals, said dither modulation signals are produced in said optical power levels of said first and second sets of optical beams, respectively.

27. The optical apparatus of claim 26 wherein said mirror-control signals include dither components, said dither components being mutually orthogonal functions of time.

28. The optical apparatus of claim 26 wherein said first spatial filter comprises an element selected from the group consisting of fiber collimators and apertures.

29. The optical apparatus of claim 28 wherein said second spatial filter comprises an element selected from the group consisting of fiber collimators and apertures.

30. The optical apparatus of claim 26 wherein said micromirrors comprise silicon micromachined mirrors.

31. The optical apparatus of claim 23 wherein said beam-modulating elements comprise spatial light modulators.

32. The optical apparatus of claim 31 wherein said spatial light modulators comprise electro-optic modulating elements in conjunction with a beam-reflector.

33. The optical apparatus of claim 23 wherein said polarization-separating element comprises an element selected from the group consisting of polarizing beam splitters and birefringent beam displacers.

34. The optical apparatus of claim 23 wherein said polarization-rotating element comprises an element selected from the group consisting of half-wave plates, liquid crystal rotators, and Faraday rotators.

35. The optical apparatus of claim 23 wherein said wavelength-disperser comprises an element selected from the group consisting of ruled diffraction gratings, holographic diffraction gratings, echelle gratings, curved diffraction gratings, transmission gratings, and dispersing prisms.

36. The optical apparatus of claim 23 wherein said beam-focuser comprises at least one focusing lens.

37. The optical apparatus of claim 23 wherein said input port comprises a fiber collimator.

38. The optical apparatus of claim 37 wherein said first output port comprises a fiber collimator.

39. The optical apparatus of claim 38 wherein said second output port comprises a fiber collimator.

40. An optical apparatus, comprising:
 a) an input port, providing a multi-wavelength optical signal;
 b) a polarization-separating element that decomposes said multi-wavelength optical signal into first and second polarization components;
 c) a polarization-rotating element that rotates a polarization of said second polarization component by approximately 90-degrees;
 d) a wavelength-disperser that separates said first and second polarization components by wavelength into first and second sets of optical beams, respectively;
 e) a beam-focuser that focuses said first and second sets of optical beams into corresponding focused spots; and
 f) an array of spatial light modulators configured to direct said first and second sets of optical beams into first and second optical detectors, respectively, said spatial light modulators being individually controllable such that optical power levels received respectively by said first and second optical detectors carry distinct dither modulation signals.

41. The optical apparatus of claim 40 further comprising first and second synchronous detection units, in communication with said first and second optical detectors, respectively.

42. The optical apparatus of claim 40 wherein said spatial light modulators comprise electro-optic modulating elements, in conjunction with a beam-reflector.

43. The optical apparatus of claim 40 wherein said polarization-separating element comprises an element selected from the group consisting of polarizing beam splitters and birefringent beam displacers.

44. The optical apparatus of claim 40 wherein said polarization-rotating element comprises an element selected from the group consisting of half-wave plates, liquid crystal rotators, and Faraday rotators.

45. The optical apparatus of claim 40 wherein said wavelength-disperser comprises an element selected from the group consisting of ruled diffraction gratings, holographic diffraction gratings, echelle gratings, curved diffraction gratings, transmission gratings, and dispersing prisms.

46. The optical apparatus of claim 40 wherein said input port comprises a fiber collimator.

47. A method of spectral modulating and monitoring using a frequency-division-multiplexing scheme, comprising:
 a) providing a multi-wavelength optical signal;
 b) separating said multi-wavelength optical signal by wavelength into multiple. spectral channels having a predetermined relative arrangement; and
 c) impinging said spectral channels onto an array of micromirrors such that each micromirror receives a unique one of said spectral channels; and
 d) pivoting said micromirrors individually such that optical power levels of said spectral channels coupled into an output port carry distinct dither modulation signals.

48. The method of claim 47 further comprising the step of performing synchronous detection of said dither modulation signals in said optical power levels.

49. The method of claim 48 further comprising the steps of converting said optical power levels to an electrical signal and detecting from said electrical signal said dither modulation signals in said optical power levels.

50. The method of claim 48 further comprising the step of performing a calibration, whereby an optical power spectrum of said multi-wavelength optical signal is obtained from said dither modulation signals.

51. The method of claim 47 wherein the said micromirrors are individually pivoted about respective nominal positions by way of a set of mirror-control signals, thereby producing said dither modulation signals in said optical power levels.

\* \* \* \* \*